United States Patent [19]

Lux

[11] Patent Number: 5,042,352

[45] Date of Patent: Aug. 27, 1991

[54] QUICK CHANGE TOOL HOLDER

[75] Inventor: Arthur J. Lux, Lockport, N.Y.

[73] Assignee: Strippit, Incorporated, Lockport, N.Y.

[21] Appl. No.: 533,090

[22] Filed: Jun. 4, 1990

[51] Int. Cl.⁵ .............................................. B26D 7/26
[52] U.S. Cl. ....................................... 83/690; 72/481; 83/698; 83/140
[58] Field of Search ................ 83/698, 686, 573, 571, 83/481, 690; 100/918; 72/448, 481

[56] References Cited

U.S. PATENT DOCUMENTS

| | | | |
|---|---|---|---|
| 1,621,811 | 3/1927 | Richard et al. | 83/698 X |
| 3,165,018 | 1/1965 | Brand | 83/571 X |
| 3,245,296 | 4/1966 | Valente | 83/698 X |
| 3,289,519 | 12/1966 | Piccone | 83/698 X |
| 3,495,495 | 2/1970 | Berry | 83/698 X |
| 3,779,122 | 12/1973 | Sawvell | 83/698 |
| 4,206,667 | 6/1980 | Hirata et al. | 83/698 X |
| 4,377,957 | 3/1983 | Wheeler | 83/698 X |
| 4,570,327 | 2/1986 | Klingel et al. | 83/698 X |
| 4,688,459 | 8/1987 | Osborn et al. | 83/698 X |

Primary Examiner—Mark Rosenbaum
Assistant Examiner—Kenneth E. Peterson
Attorney, Agent, or Firm—Hill, Van Santen, Steadman & Simpson

[57] ABSTRACT

A quick change tool holder for a punch press having a die holder, a die base secured to the puch press and a releasable holding device which is manually actuatable to secure and release the die holder to and from the die base without the use of any tools. The die holder is secured to the die base horizontally, vertically and rotationally by an interengagement between the parts. Preferably the releasable holding device includes a spring biased plunger carried on the die holder which has a portion normally biased into engagement with the die base.

16 Claims, 2 Drawing Sheets

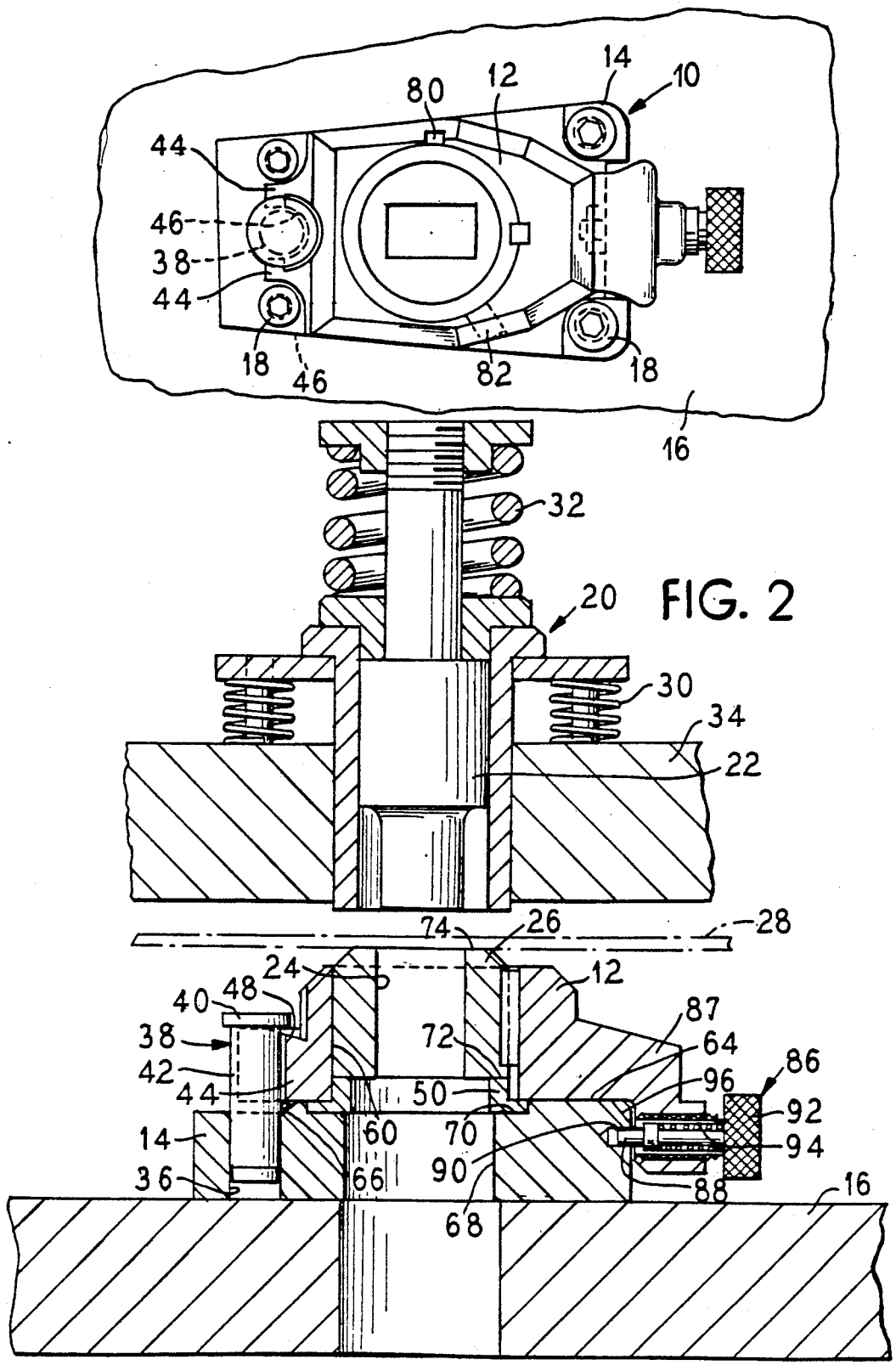

5,042,352

QUICK CHANGE TOOL HOLDER

BACKGROUND OF THE INVENTION

The present invention relates generally to a tool holder which can be manually secured to and released from a base and more particularly to a die holder which can be used to hold a die below a punch in a punch press and can also be used to quickly release and change the held die.

In presently available punch presses a die is held in a die holder which in turn is installed in a die base located in the lower portion of a work station, such as in a turret if the punch press is of the turret type. In such an installation, typically the die base is bolted to the lower turret and may also be mechanically doweled to the turret to ensure that alignment is maintained between the punch and die in the upper and lower turrets, respectively.

The die holder usually has some arrangement to grip the die. For example, this may be a set screw or a vlier pin. Typically, a die is placed in a die holder and the assembly is then installed in a die base. The assembly is usually held in the die base with a fastener such as a set screw or Allen head bolt which requires the use of a wrench or other tool to install and remove a die from the turret. These assembly and removal steps are further complicated by the need to add shims on occasion to raise the height of a die which has been ground to restore its punching edge or surface. The shims generally are loose and must be placed between the die base and the die holder. It is therefore difficult to hold the shims in place while installing a die and holder assembly into a die base.

SUMMARY OF THE INVENTION

The present invention includes a base and a holder which provides a means for holding a tool such as a punch press die, a means for containing shims when necessary, a means for ensuring precise alignment of the tool and holder in the base, and a means to remove the holder from the base without the use of a tool. By use of the present invention reduced set up times will result when changing tools such as dies in a punch press.

In a preferred embodiment of the invention, the means for holding a tool comprises a die holder having a locating pin which can be received in a die base to assure proper alignment of the die below the punch in a punch press. The die holder includes a space therein for receiving the loose shims as necessary. The die and die holder are held in precise alignment in the die base by means of a locating pilot and the locating pin. The means to remove the die holder from the base without use of a tool comprises a hand retractable spring plunger which is carried by the die holder and which is selectively engageable into the die base to hold the die holder onto the die base. The plunger is generally biased into engagement with the die base therefore locking the die holder to the die base. However, manual force can overcome the biasing force of the spring thus permitting the die holder to be quickly and easily removed from the die base to effect a change of the die.

BRIEF DESCRIPTION OF THE DRAWINGS

FIG. 1 is a plan view of a die holder embodying the principles of the present invention.

FIG. 2 is a side sectional view of the die holder of FIG. 1 positioned beneath a punch in a punch press.

DESCRIPTION OF THE PREFERRED EMBODIMENTS

Figure 3:
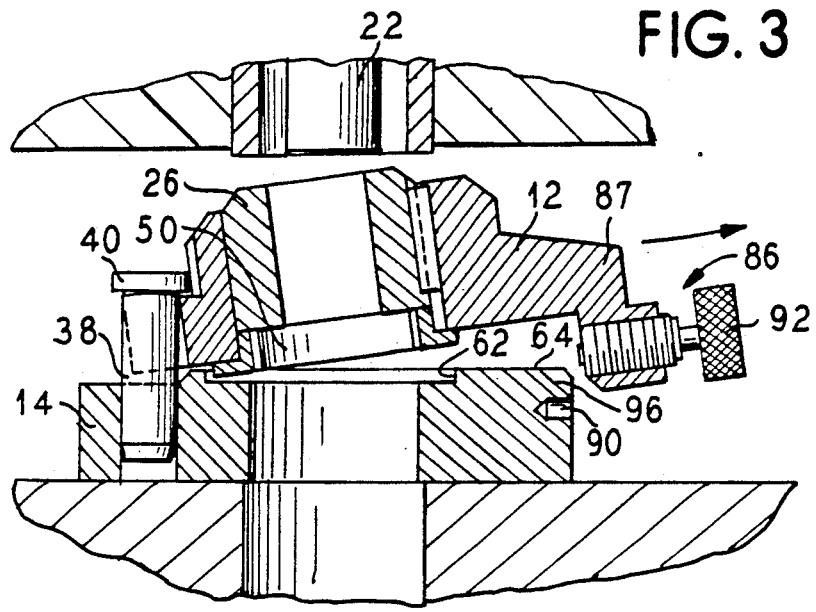
FIG. 3 is a side sectional view of the die holder being released from the die base.

Although a preferred embodiment of the invention is disclosed as being a quick release die holder for use in a punch press, it should be understood that the invention is not so limited. That is, tools other than dies could be held by the holder, and in environments other than in a punch press. However, the invention does find particular utility in holding dies in a punch press and therefore the disclosure will be directed to such an embodiment.

Referring to FIG. 1, a device embodying the principles of the present invention is shown generally at 10 and includes a die holder (or tool holder) 12 and a die base 14. The die base 14 is secured in place, for example to the lower turret 16 of a turret punch press, by means of bolts 18 as is known in the art. As best seen in FIG. 2, the die holder 12 and die base 14 are positioned beneath a punching tool 20 such that an extendable and retractable punch 22 is precisely aligned with an aperture 24 in a die 26 (or other tool) held by the die holder 12. A sheet of material 28 is placed between the punch 22 and die 26 and is held in a precise location during the punching process when the punch 22 is forced through the sheet material 28 and into the die 26 thus causing the removal of a portion of the sheet 28 conforming to the external shape of the punch 22. Appropriate return mechanisms 30, 32, usually in the form of springs are commonly utilized to return the die 22 to a retracted position.

If the particular punch press hapens to be of the turret type, the punch assembly 20 would be carried in an upper turret 34 which would be rotatable, usually simultaneously, with the lower turret 16. It should be made clear, however, that the present invention is usable in any type of punch press, not only of the turret type, but also of the stationary tool station type as well as the type having removable and replaceable tools in which the tools are removed and replaced either manually or automatically by a tool changer.

As described above, the die base 14 is secured by bolts 18 to be immobile relative to its support such as the lower turret 16. The die base 14 includes a bore 36 which may be a through bore if desired for receiving a vertically oriented member such as a locating pin 38. The pin 38 has a top stop or head 40 at a top end thereof which has a diameter greater than that of a shank portion 42 of the pin 38. The shank is received in the bore 36 in a force fit such that it will not easily become dislodged from the bore or axially moved within the base.

Figure 5:
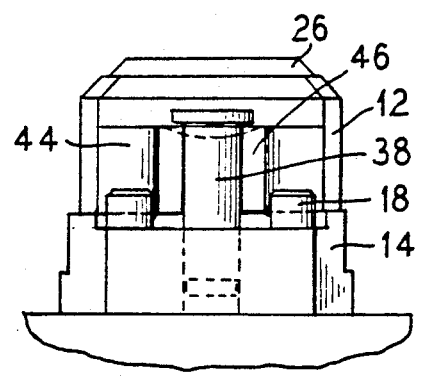
FIG. 5 is a side elevational view of the die holder showing the locating pin.

The die holder 12 has a horizontal member in the form of a pair of forwardly extending fingers 44 (FIGS. 1, 2 and 5) which are connected by means of an arcuate wall 46. The wall is sized and shaped such as to surround and engage the shank 42 of the pin 38 and the fingers 44 are sized and shaped so as to be captured below the head 40 of the pin 38. The capturing of the fingers 44 below the head 40 vertically secures that end of the die holder 12 on the die base. As best seen in FIG. 2, a top surface 48 of the fingers 44 is sloped upwardly toward a free end of the fingers to permit the die holder 12 to be pivoted upwardly at an end opposite the fingers 44 such as shown in FIG. 3. This is required for removal of the die holder 12 from the die base 14 or replacement of the die holder to the die base.

Figure 7:
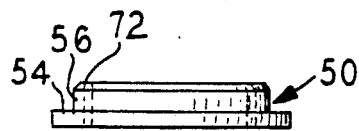
FIG. 7 is a side elevational view of a die holder pilot used with the die holder and die base.
Figure 8:
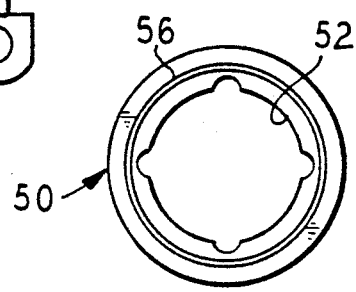
FIG. 8 is a top view of the die holder pilot.

Positioned between the die holder 12 and die base 14 is a die holder pilot 50 which is shown in isolated detail in FIGS. 7 and 8. The die holder pilot 50 is a ring-shaped member having a central open area 52 and an outer flange 54 having a diameter greater than that of a body portion 56. The body portion 56 has a generally cylindrical outer surface which has a diameter substantially equal to that of an interior through bore 60 of the die holder so that the die holder pilot 50 will be frictionally held in the die holder 12 by means of an interference fit. Thus, the die holder pilot 50 will be carried by the die holder 12 without the need for additional fasteners. The flange portion 54 of the die holder pilot 50 has a diameter substantially equal to that of a cylindrical recess 62 formed in a top wall 64 of the die base 14 so that the die holder pilot 50 (and thus the die holder) will be held horizontally stationary in the die base 14. The recess 62 is laterally spaced from bore 36.

The top wall 64 of the die base 14 slopes downwardly at a point indicated by reference numeral 66 (FIGS. 2, 6), adjacent to the bore 36 for the locating pin 38. The downward slope permits pivoting of the die holder 12 for insertion and removal as illustrated in FIG. 3.

A central through bore 68, smaller in diameter than recess 62 is provided in the die base 14, concentric with the recess 62, to permit passage of material which has been punched from the material sheet 28. Thus, a ledge 70 is provided upon which the die holder pilot 50 rests. With the die holder pilot 50 positioned in the recess 62 and the fingers 44 surrounding the pin 38, the die holder will be rotationally secured to the die base.

A top wall 72 of the die holder pilot 50 comprises a supporting surface for the die 26. In the event that shims are required to raise the height of the die 26 due to grinding of the die to restore its punching edge or surface 74, the shims may be placed between the die 26 and the die holder pilot 50 on support surface 72. Thus, the shims will be securely held in place as the die holder 12 is removed from or inserted into the die base 14 without the need for additional fasteners and the shims will not be able to become dislodged within the assembly of the die holder 12 and die holder pilot 50.

The die 26 is angularly positioned within the die holder by means of a keyway 80 at one or more locations in the die holder 12 and by provision either of a separate keyway in the die or the formation of an axially extending rib on the die which mates with the keyway on the die holder. Further, appropriate securing means 82 such as a set screw retains the die axially in the die holder (FIG. 1).

The die holder 12 is further vertically secured on the die base 14 by a releasable retaining means which may be in the form of a hand retractable spring plunger 86 carried on the die holder 12 in an arm 87 extending down below the top surface 64 of the die base 14 (FIG. 2). The spring plunger includes a projecting pin portion 88 which is receivable in a horizontal blind bore 90 in a side wall of the die base. A knurled knob 92 is accessible for use by the machine operator to retract the pin 88 from the bore 90 by pulling the knob 92 horizontally to overcome the bias of a restoring spring 94 which normally urges the pin 88 into the bore 90. With the pin 88 retracted, the die holder 12 will be free to pivot upwardly as illustrated in FIG. 3 to permit removal of the die holder 12 from the die base 14 for replacement or exchange of the die 26. No tools are required to be used by the operator in actuating the releasable retaining means to remove the die holder 12 from the die base 14.

Replacement of the die holder 12 to the die base 14 occurs in an equally simple manner. That is, the die holder, with its associated die holder pilot 50 is guided toward the die base 14 and the fingers 44 are placed under the head 40 of the locating pin 38. The interaction of the die holder 12 and the locating pin 38 as well as the seating of the die holder pilot 50 within the recess 62 in the top surface 64 of the die base 14 will provide precise rotational and horizontal alignment of the die 26 relative to the punch 22. Releasing of the knob 92 once the die holder 12 has been rotated down to the working position will automatically cause engagement of the pin 88 with the bore 90 to prevent vertical movement of the die holder 12 and thus will ensure continued securement of the die holder 12 onto the die base 14.

Figure 4:
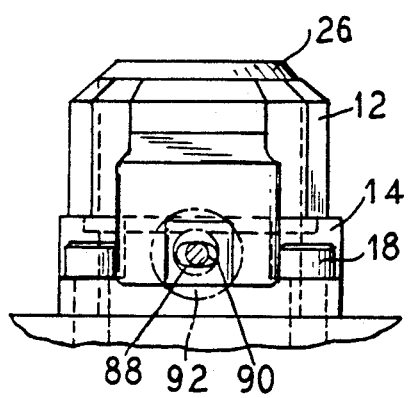
FIG. 4 is a side elevational view of the die holder showing the plunger.
Figure 6:
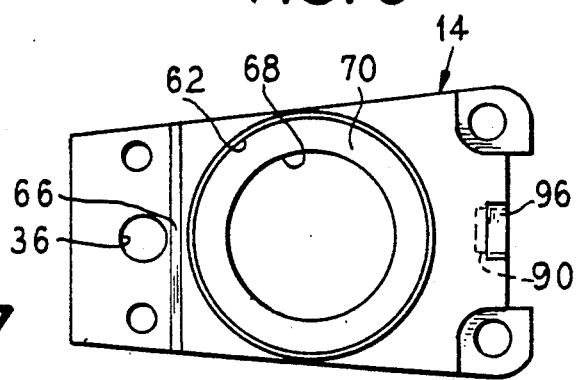
FIG. 6 is a top elevational view of the die base used with the die holder of the present invention.

As seen best in FIGS. 4 and 6, the bore 90 in the die base is in the form of a horizontal slot since the pin 88 is utilized only to prevent vertical movement between the die holder 12 and die base 14. By providing a horizontal slot 90, the pin 88 will not affect the precise alignment of the die 26 by means of engagement of the die holder pilot 50 in the recess 62 and the engagement of the guide pin 38 by the fingers 44. Also, an angled slot 96 is provided in the die base 14 just above the bore 90 which will cause the pin 88 to be pressed against the spring 94 as the die holder 12 is being rotated into position onto the die base 14 so that the operator will not need to manually retract the pin by use of the knurled knob 92 when inserting the die holder 12 onto the die base 14.

Thus it is seen that the present invention provides a tool holder that is held onto a base by means of a quick release mechanism that is manually actuatable without the use of any tools.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A quick change die holder for use in a punch press comprising:
   die holder means for holding a punch press die;
   die base means secured to said punch press for receiving said die holder means;
   releasable holding means for holding said die holder means onto said die base means;
      said releasable holding means being manually actuatable to secure and release said die holder means to and from said die base means without the use of any tools;
   said releasable holding means including a vertically oriented locating pin on said die base means, said locating pin including a horizontal top stop;
   a pair of fingers, connected by an arcuate wall, on said die holder means;

wherein said fingers engage said locating pin under said top stop to vertically secure said die holder means to said base means, and said fingers at least partially surround and engage said locating pin to rotationally secure said die holder to said die base means.

2. A quick change die holder according to claim 1, wherein said die base means has a recess formed in a top wall thereof for receiving said die holder means.

3. A quick change die holder according to claim 1, wherein said releasable holding means is carried on said die holder means and has a portion engageable with said die base means.

4. A quick change die holder according to claim 3, wherein said releasable holding means is normally biased into engagement with said die base means when said die holder means is positioned on said die base means.

5. A quick change die holder according to claim 1, wherein said die base means includes positioning means thereon engageable with positioning means on said die holder means to provide precise alignment between said die holder means and said die base means.

6. A quick change die holder according to claim 5, wherein said positioning means on said die base means comprises a recess for receiving said die holder means and said vertically oriented locating pin.

7. A quick change die holder according to claim 1, wherein said die holder means comprises a die holder and a die holder pilot, said die holder pilot being held on said die holder and engageable with a portion of said die base means to guide said die holder into proper alignment with said die base means.

8. A quick change die holder according to claim 1, wherein said die holder means includes means for retaining shims to be used to adjust the height of said punch press die.

9. A quick change die holder for a punch press comprising:
a die base having a first central vertical through bore with a recessed area at a top end thereof having a diameter greater than said through bore, a second vertical bore formed in a top wall of said die base and being spaced from said first through bore, and a horizontal blind bore formed in a side wall opposite said first through bore from said second bore;
a die holder receivable in said recess of said die base having a central vertical through bore for receiving a punch die, a pair of fingers joined by an arcuate wall at one end and a downwardly extending arm at an opposite end horizontally carrying a spring biased plunger with a knurled knob at an outer side and a pin projecting inwardly, said spring biasing said pin inwardly;
a locating pin having a horizontal top stop, said locating pin being held in said second vertical bore in said die base and projecting thereabove;
wherein said fingers of said die holder surround and said arcuate surface engages said locating pin under said horizontal top stop and said spring biased pin engages in said horizontal blind bore on said die base when said die holder is positioned in said recessed area of said die base to secure said die holder to said die base horizontally, vertically and rotationally.

10. A quick change die holder according to claim 9, further including a die holder pilot held in a bottom of said die holder having a central through bore and having a stepped outer surface, an upper portion of said surface being cylindrical and having a diameter substantially equal to said through bore of said die holder, a lower portion of said surface being cylindrical and having a diameter substantially equal to said recessed area in said die base, said die holder pilot being held onto said die holder by an interference fit.

11. A quick change tool holder comprising:
holder means for holding a tool;
base means for receiving said holder means;
releasable retaining means for retaining said holder means onto said base means;
said releasable retaining means being manually actuatable to secure and release said holder means to and from said base means without the use of any tools;
wherein said base means includes positioning means thereon engageable with positioning means on said holder means to provide precise alignment between said holder means and said base means;
wherein said positioning means on said base means includes a recess for receiving said holder means and a vertically oriented locating pin and said positioning means on said holder means comprises a pair of fingers connected by an arcuate wall to surround and engage said locating pin;
wherein said releasable retaining means includes a horizontal top stop, on said vertically oriented locating pin, said pair of fingers on said holder means engageable under said horizontal top stop on said base means which vertically secures said holder means to said base means;
wherein said releasable retaining means includes a recess for receiving said holder means and said vertically oriented locating pin on said base means and said pair of fingers are connected by an arcuate wall on said holder means to surround and engage said locating pin which rotationally secures said holder means to said base means.

12. A quick change tool holder according to claim 11, wherein said holder means is adapted to hold a die for a punch press.

13. A quick change tool holder according to claim 11, wherein said releasable retaining means is carried on said holder means and has a portion engageable with said base means.

14. A quick change tool holder according to claim 13, wherein said releasable retaining means is normally biased into engagement with said base means when said holder means is positioned on said base means.

15. A quick change tool holder according to claim 11, wherein said holder means comprises a die holder and a die holder pilot and said base means comprises a die base, said die holder pilot being held on said die holder and engageable with a portion of said die base to guide said die holder into proper alignment with said die base.

16. A quick change tool holder according to claim 11, wherein said holder means includes means for retaining shims to be used to adjust the height of said tool within said holder means.

* * * * *